No. 756,942. PATENTED APR. 12, 1904.
J. G. DUCK.
STEAM SEPARATOR.
APPLICATION FILED JUNE 6, 1902.
NO MODEL. 2 SHEETS—SHEET 1.
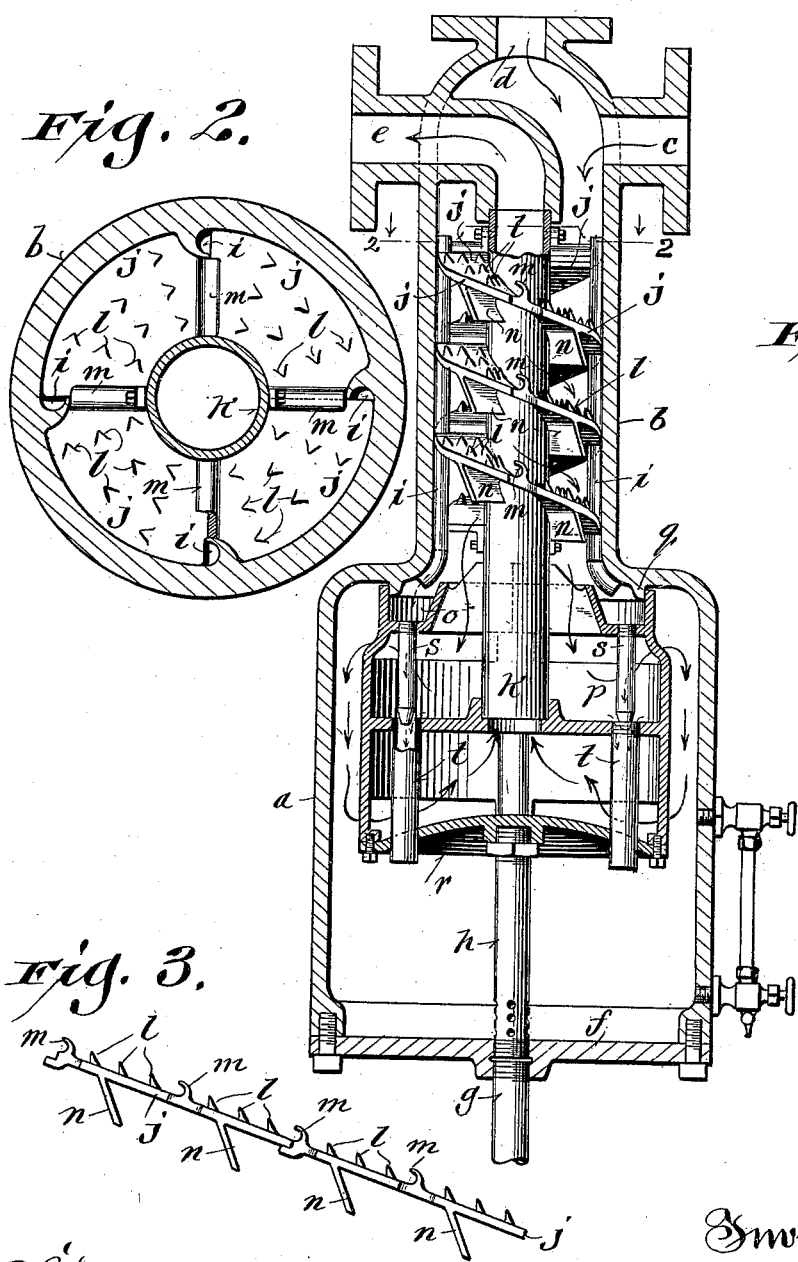
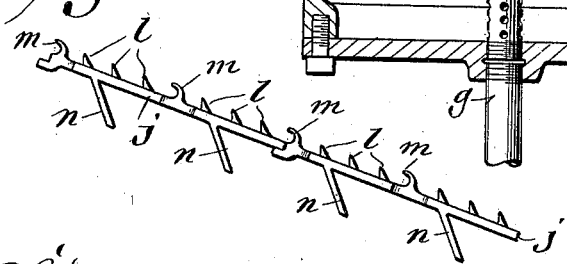
Witnesses:
Geo. W. Young,
Chas. L. Goss.
Inventor:
Joseph G. Duck,
By Winkler Flanders Smith Bottum Vilas
Attorneys.

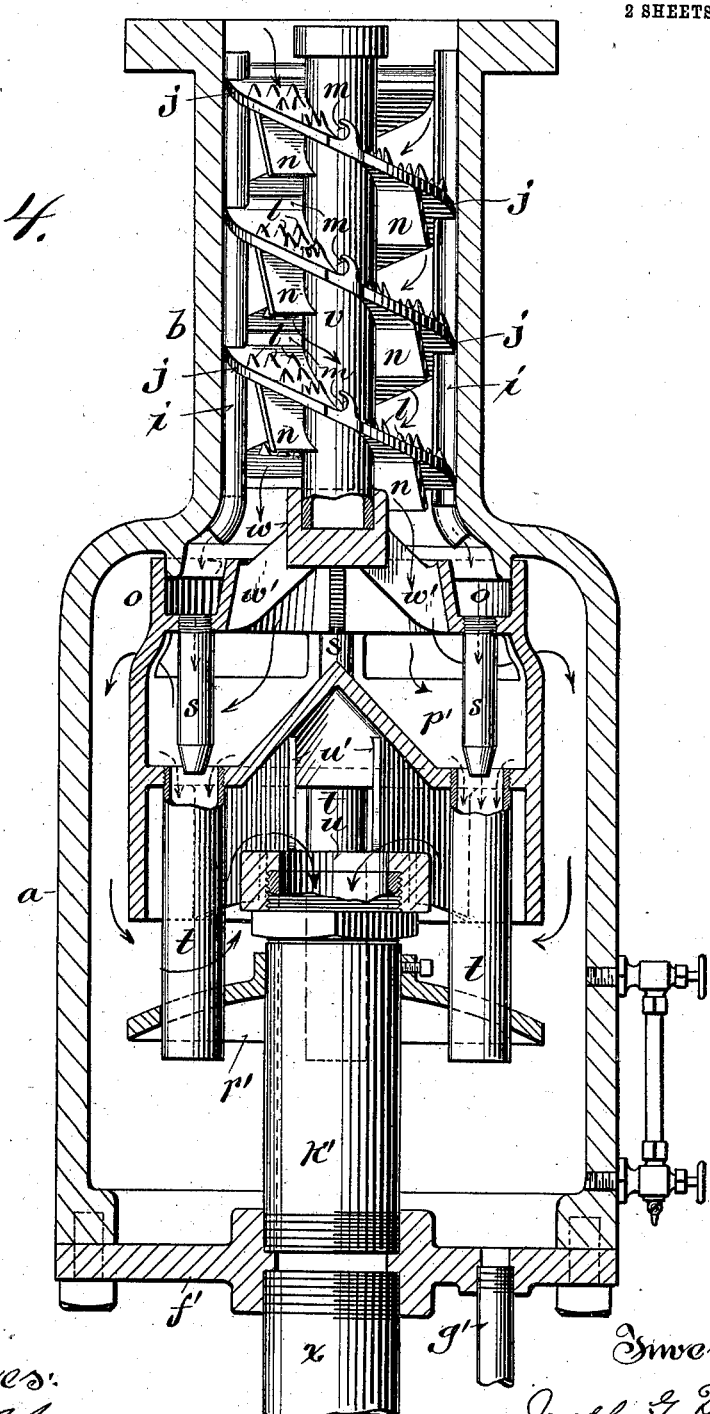

No. 756,942.

Patented April 12, 1904.

UNITED STATES PATENT OFFICE.

JOSEPH G. DUCK, OF MILWAUKEE, WISCONSIN, ASSIGNOR OF ONE-HALF TO JOHN G. THOMPSON, OF MILWAUKEE, WISCONSIN.

STEAM-SEPARATOR.

SPECIFICATION forming part of Letters Patent No. 756,942, dated April 12, 1904.

Application filed June 6, 1902. Serial No. 110,403. (No model.)

*To all whom it may concern:*

Be it known that I, JOSEPH G. DUCK, a citizen of the United States, residing at Milwaukee, in the county of Milwaukee and State of Wisconsin, have invented certain new and useful Improvements in Steam-Separators, of which the following is a specification, reference being had to the accompanying drawings, forming a part thereof.

This invention relates to apparatus for separating water of condensation and oil or other liquid entrained therewith from steam. Its main objects are to facilitate and effect a thorough separation of water or other liquid from steam, to deliver the steam in a dry condition to an engine or other apparatus in which it is to be used for heating, power, or other purposes, and generally to improve the construction and operation of apparatus of this class.

It consists in certain novel features of construction and in the arrangement and combinations of parts hereinafter particularly described, and pointed out in the claims.

In the accompanying drawings like letters designate the same parts in the several figures.

Figure 1 is a vertical section of one form of separator embodying my invention. Fig. 2 is an enlarged horizontal section of the same on the line 2 2, Fig. 1. Fig. 3 is a developed edge view of a portion of one of the spirals forming sinuous steam-passages; and Fig. 4 is a vertical section, on an enlarged scale, of a modified form of the separator.

A steam plant without some provision for the elimination of moisture from the live steam or the elimination of oil or grease from the exhaust-steam is incomplete. Steam-separators having large receiving-chambers operate as continuous condensers, and no matter how well protected by external covering they may be they have not been found economical and satisfactory. I have found that the most perfect separation of steam from water, oil, or other liquid can be effected and the most satisfactory results secured by means of a separator having steam-passages just large enough to allow the steam to flow through the separator without increasing friction, and consequent reduction of pressure, in live-steam pipe or back pressure in exhaust-steam pipe and also having provision for breaking the current of steam and causing it to come in contact with metal surfaces and for immediately conducting off the separated liquid out of contact with the steam. These conditions are fulfilled and the foregoing objects are attained by a separator constructed substantially as herein shown and described.

Referring to Fig. 1, $a$ is a cylindrical casing inclosing a chamber for water of condensation. It is formed at the top with a contracted neck $b$, which has steam-inlet connections $c$ and $d$ and a steam-outlet connection $e$ at its upper end. The outlet connection $e$ is extended inside of the neck $b$ and formed with a downturned elbow. The connections $c$ and $e$ are arranged horizontally in line with each other, and the connection $d$ is arranged vertically and centrally at the top of the neck $b$. By means of this arrangement of the inlet connections the separator may be attached to either a horizontal or a vertical steam-supply pipe, one of the connections being closed by a cap. The bottom $f$ of the casing $a$ is made detachable and is formed with a central opening in which are threaded or otherwise secured a water-discharge or waste pipe $g$, leading downwardly from the separator, and a pipe $h$, extending upwardly into the separator, the pipe $h$ being perforated near the bottom to allow the water of condensation to drain from the chamber in the lower part of the separator into the pipe $g$. The neck $b$ is formed at the sides with interior vertically-disposed channels $i$, which are open on one side except at their lower ends, which are closed on all sides and are curved outwardly to prevent the water or liquid which has just been separated from the steam from being again taken up by and carried along with the steam. Within the neck $b$ spirals $j$ are fitted around a central steam-outlet pipe $k$, which connects at its upper end with the elbow at the inner end of the outlet connection $e$. There are preferably two of these spirals, forming two sinuous passages for the steam on its way from either of the inlet connections $c$ or $d$ to the chamber in the lower part of the separator. These spirals may be formed in sections, the upper and lower sections of each being bolted or otherwise secured to the pipe $k$. Each spiral is formed on the upper side with rearwardly-inclined spines or spikes $l$ and is also formed at every quarter-turn or other suitable intervals with transverse gutters or channels $m$, which register at their outer ends with the channels $i$. The spines or spikes $l$ are arranged in rows transverse to the spirals and are preferably staggered, as shown in Fig. 2. On the under side each spiral is formed with downwardly-projecting and forwardly-inclined deflectors $n$, which preferably alternate with the gutters, being so arranged as to direct the steam and water entrained therewith downwardly against the opposing spikes $l$ on the spirals next below. $o$ and $p$ are horizontally-disposed catch-basins and baffle-plates arranged one above the other below the spirals $j$. The upper catch-basin and baffle-plate $o$ is of annular form, and its outer rim fits over an annular flange $q$ in casing $a$. The other catch-basin and baffle-plate $p$ has a central upwardly-flanged opening, in which the lower end of the pipe $k$ is fitted. It is preferably cast with the upper basin $o$, openings being formed between them for the outward passage of steam, and it is provided with a depending flange or skirting, to which a shield $r$ is attached to prevent the steam from coming in contact with the water, oil, or other liquid from which it has been separated. The shield $r$ is attached to the upper end of the pipe $h$, and the spirals $j$, the pipe $k$, and the catch-basins and baffle-plates $o$ and $p$ can thus be readily removed, together with it and the bottom $f$, from the casing $a$ for inspection, cleaning, and repairs. The shield $r$ is preferably made rounding or convex on the upper side to readily shed water deposited upon it, and openings are formed above it in the skirting of the basin $p$ for the inward passage of steam to the lower end of pipe $k$. $s\ s$ are drain-tubes extending downwardly from the annular basin $o$, and $t\ t$ are drain-tubes extending downwardly from the basin $p$ through the deflector $r$. The tubes $s$ project at their lower ends into the upper ends of the tubes $t$ and are of smaller diameter, so that they may be passed through the openings in the basin $p$ and screwed into the basin $o$, and the liquid caught in said basins will be immediately drawn therefrom by the siphon or sucking action produced by the downward currents through said tubes. This form of the separator operates as follows: Steam entering at the upper end of the neck $b$ through the connection $c$ or $d$ passes downwardly in a sinuous course over the spirals $j\ j$, on which the water and oil or other liquid carried with the steam is deposited, the deflectors $n$ directing the steam downwardly against the upper spiked faces of the spirals next below them. The water and oil or other liquid thus deposited on the spirals is caught in the gutters $m$ and immediately conducted therefrom by the channels $i$ out of the main path of the steam into the upper catch-basin $o$. The steam issuing from the sinuous passages at the lower ends of said spirals passes through the central opening in the basin $o$, around the pipe $k$, thence outward and downward outside of the basin $p$, thence inward through the openings in the skirting of the basin $p$, over the shield $r$ into pipe $k$, from which it issues through the outlet connection $e$ in a dry state. Any moisture carried by the steam after leaving the spirals $j$ is caught in the basins $o$ and $p$ and upon the shield $r$, and the water of condensation, with oil or other liquid deposited in the basins $o$ and $p$, is immediately discharged through the tubes $s$ and $t$ into the chamber in the lower part of the separator, from which it is drawn off from time to time through the pipe $g$, this pipe being provided with a valve, which is not shown. The separator may be provided with a float or automatic valve for discharging the water of condensation whenever it rises to a certain level therein. The moisture deposited on other internal surfaces of the separator, including the walls of casing $a$ and the shield $r$, drains therefrom into the lower part of the separator below said shield.

Referring to Fig. 4, the separator therein shown is substantially like that shown in Fig. 1, except that the steam-outlet pipe $k'$ within the separator passes downwardly from a point below the lower catch-basin and baffle-plate $p'$ through the shield $r'$ and through the bottom $f'$ of the casing. At its upper end the pipe $k'$ is secured in a collar $u$, connected by wings $u'$ with the bottom and skirting of the basin $p'$. The deflector $r'$ is secured by a set-screw or other means on the pipe $k'$ independently of the basin $p'$ and its skirting. The spirals $j$ wind around and are carried by a central rod or pipe $v$, which is held at its lower end in a socket $w$, cast or centrally connected with the upper catch-basin $o$ by radiating wings $w'$. In this case the pipe $g'$ for drawing off the water of condensation from the separator is attached to the bottom to one side of its center, and the external steam-outlet connection is made by a pipe $x$, attached centrally to the bottom in line with the pipe $k'$. The operation of this form of the separator is substantially the same as that of the other form first described and explained. In both forms the steam upon entering the separator is separated into two streams or currents, to which a spiral direction is given by the spiral plates $j$. After making two turns these streams or currents are united and pass together downward through the opening in the upper catch-basin and baffle-plate, thence outward through the openings between the upper and lower basins and baffle-plates, thence downward between the outer casing $a$ and the rim and skirting of the lower catch-basin and baffle-plate, and thence inward between the shield and the skirting of the lower basin and baffle-plate to the outlet-pipe. In its sinuous course through the separator the steam is thus broken up and brought into direct contact with metal surfaces, on which the particles of liquid entrained therewith are deposited. From these metal surfaces the liquid is immediately conducted off out of contact with the steam, and thus prevented from being again taken up and carried along with it. The spiral direction given to the flow of steam as it enters the separator tends to separate particles of liquid therefrom by centrifugal force, the particles of liquid thus separated from the steam being caught by the outer walls of the spiral passages of the separator and conducted out of the direct course of the steam, as above explained.

Various changes in details of construction and in the arrangement of parts other than those specifically shown and described may be made within the spirit and intended scope of the invention.

I claim—

1. In a steam-separator, the combination of a chamber having steam inlet and outlet connections and a water-discharge connection, and a spiral arranged in the path of the steam and having horizontally-disposed transverse gutters communicating with vertically-disposed channels leading into said chamber, substantially as described.

2. In a steam-separator, the combination of a chamber having steam inlet and outlet connections and a water-discharge connection, and a spiral arranged in the path of the steam and having on the upper side staggered spikes and at intervals transverse horizontally-disposed gutters for conducting off the water intercepted by said spikes, substantially as described.

3. In a steam-separator, the combination of a chamber having a vertically-disposed contracted neck with a steam-inlet at the upper end, a steam-outlet and a water-discharge connection, and a spiral coiled within said neck around its axis and having on the upper side transverse gutters which communicate with channels leading downward into said chamber, substantially as described.

4. In a steam-separator, the combination of a chamber having a contracted neck with a steam-inlet at its upper end, a horizontally-disposed catch-basin and a shield arranged one above the other in said chamber, a steam-outlet leading from said chamber above said shield, drain-tubes passing downwardly from said catch-basin into the chamber below said shield, a spiral coiled within said neck around its axis and drain-channels leading from said spiral into said catch-basin, substantially as described.

5. In a steam-separator, the combination of a chamber having a contracted neck with a steam-inlet at its upper end, a number of horizontally-disposed catch-basins arranged one above another in said chamber, drain-tubes passing downwardly from said catch-basins, water-discharge and steam-outlet connections leading from said chamber, and a spiral coiled within said neck around its axis and having transverse gutters on the upper side communicating with channels leading downwardly therefrom into the upper catch-basin, substantially as described.

6. In a steam-separator, the combination of a chamber having steam inlet and outlet connections and a water-discharge connection, and a spiral arranged in the steam-inlet passage to said chamber provided on one side with transverse gutters and on the other side with deflectors, substantially as described.

7. In a steam-separator, the combination of a chamber having steam inlet and outlet connections and a water-discharge connection, a spiral arranged in the steam-inlet passage to said chamber and provided on the upper side with spikes and on the under side with deflectors arranged to direct steam against the opposing spikes, and drain-channels extending transversely across the upper side of said spiral and leading therefrom downwardly into said chamber, substantially as described.

8. In a steam-separator, the combination of a chamber having a detachable bottom and a contracted neck with a steam-inlet at its upper end, a spiral fitted in said neck to form a sinuous passage for the inflowing steam and having transverse gutters arranged to communicate with channels leading downwardly in said neck into said chamber, one or more catch-basins and a deflector, connected one above another below and with said spiral and also connected and removable together with the detachable bottom of said chamber, and drain-tubes extending downwardly from each catch-basin, substantially as described.

9. In a steam-separator, the combination of a chamber having a contracted neck with a steam-inlet at the upper end and descending channels on the sides, a spiral fitted in said neck to form a sinuous passage for the inflowing steam and having transverse gutters communicating at their outer ends with the channels in said neck, horizontally-disposed catch-basins arranged one above another below said spiral, the upper catch-basin being annular in form and placed in position to receive the discharge from the lower ends of the channels in said neck, a steam-outlet pipe passing downwardly through the bottom of said chamber from a point below the lower catch-basin, a shield on the upper end of said outlet-pipe, and drain-tubes extending downwardly from said catch-basins, the drain-tubes of the upper basin discharging into the drain-tubes of the lower basin and the drain-tubes of the lower basin extending through and discharging below said shield, substantially as described.

10. In a steam-separator, the combination of a chamber having a detachable bottom with a steam-outlet and water-discharge pipes attached thereto and a contracted neck having a steam-inlet connection at its upper end and descending drain-channels at its sides, a spiral fitted in said neck and having transverse gutters communicating with the channels in said neck, horizontally-disposed catch-basins arranged one above the other, a shield on the upper end of the steam-outlet pipe, and drain-tubes extending downwardly from the catch-basins, the drain-tubes of the lower basin passing through and discharging below said shield, said spiral and catch-basins being attached to each other and to the steam-outlet pipe by which they are supported, substantially as described.

In witness whereof I hereto affix my signature in presence of two witnesses.

JOSEPH G. DUCK.

Witnesses:
   JOSEPH F. KAMINSKY,
   CHAS. L. GOSS.